Feb. 25, 1958   M. E. HEARD   2,824,581
SHUTTLE
Filed March 15, 1955

INVENTOR
MAURICE EARL HEARD

BY Cushman, Darby & Cushman
ATTORNEYS

United States Patent Office 2,824,581
Patented Feb. 25, 1958

2,824,581

SHUTTLE

Maurice Earl Heard, Shawmut, Ala., assignor, by mesne assignments, to West Point Manufacturing Company, West Point, Ga., a corporation of Georgia Application March 15, 1955, Serial No. 494,376

4 Claims. (Cl. 139—196)

This invention relates to improvements in shuttles.

Textile shuttles as used in weaving looms are subjected to exceedingly rough usage. To achieve high loom production, shuttles must traverse the looms with great speed, and must be started and stopped with tremendous force. Average shuttle life is accordingly short, and the cost of shuttle replacement correspondingly high. Various types of plastic shuttles have been proposed, but exhibit shortcomings, particularly in that the metal nose pieces thereof are prone to loosen or break out in use. The mounting of the nose pieces in the shuttles gives rise to stress concentrations at these points, which crack or split the shuttle ends in relatively short periods of time.

A general object of the present invention is to provide an improved shuttle capable of long life in severe service, with resulting economy.

A particular object of the invention is to provide textile shuttles comprising end blocks possessing unusual strength and resistance to impact and impact fatigue.

Other objects are to provide shuttles constructed of materials having optimum properties, including low water absorption and excellent machinability. Further objects will be in part evident and in part pointed out hereinafter.

Figure 1:
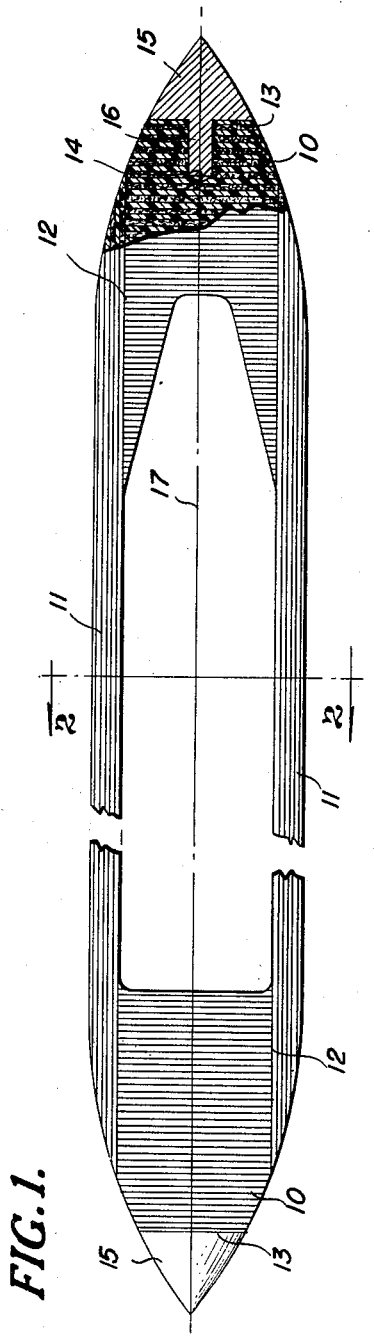
Figure 2:
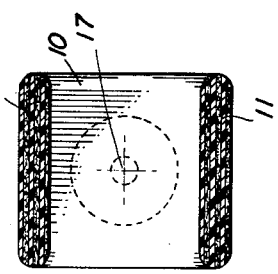

The invention and the novel features thereof may best be made clear from the following description, and the accompanying drawings, in which:

Figure 1 is a plan view, partly sectioned, of an illustrative embodiment of the present invention, and Figure 2 is a transverse section taken on the line 2—2 of Figure 1.

Referring to the drawings in detail, the illustrated embodiment of the invention is a shuttle of multiple piece construction, including end blocks 10 joined by laterally spaced and opposed side pieces 11. The side pieces overlap the end blocks to a considerable extent, and are bonded or similarly affixed thereto along the joint lines 12, to form the conventional shuttle configuration. The outer end of each end block is cut square, as at 13, and from each end surface 13 an axial bore 14 extends inwardly into the block. A conventional steel nose piece 15 may be fitted to each end block, by firmly setting the nose piece stud 16 in the bore 14 of the end block.

As an outstanding feature of the invention, the end blocks 10 are constructed of laminated plastic material, reinforced with parallel layers of unwoven fabric. The preferred plastic materials are phenol- and urea-formaldehyde condensation products, but other resinous and similar plastic materials, including cellulose aceto-butyrate, cellulose acetate, ethyl cellulose, methyl methacrylate, polystyrene, and vinyl polymers and copolymers may be used. The resinous or other plastic material is laminated with layers of unwoven fabric of uniform texture and strength in all directions, in which the individual fibers are arranged in random relationship.

A preferred unwoven fabric of this type is sold under the trademark "Lantuck" by Wellington Sears Company, and may be manufactured as described in Wilson et al. U. S. Patent 2,477,675 and Phillips et al. U. S. Patent 2,648,876.

In the shuttle, the end blocks are arranged with the laminations thereof disposed in planes normal to the shuttle axis 17, as shown. The laminate material may be manufactured in conventional manner, and the end blocks readily formed therefrom by machining, the laminate material exhibiting excellent machining properties which greatly facilitate forming and polishing thereof. The side pieces 11 may be constructed of wood or plastic, but preferably are constructed of the same laminated plastic material of which the end blocks are composed. In such preferred case, the side pieces are arranged with the laminations thereof disposed in vertical planes parallel to the shuttle axis, or flatwise of the side pieces. The side pieces and end blocks may be joined together by a resinous bond, adhesively, by screws, rivets or otherwise. Similarly, the metal nose pieces 15 may be firmly engaged to the end blocks by resinous bond, adhesive, screw threads or the like.

The laminate reinforced by unwoven fabric is particularly advantageous in shuttle construction, due to its outstanding and unexpectedly superior physical properties. Average test values of the mechanical properties of the laminated plastic material reinforced with unwoven fabric, and comparative values for corresponding materials reinforced by woven fabrics, are set forth in the table below.

Table I

|  | Unwoven Fabric Laminate | Cloth or Linen Laminate | Canvas Laminate |
| --- | --- | --- | --- |
| Tensile Strength, p. s. i.: |  |  |  |
| Lengthwise | 18,000 |  |  |
| Crosswise | 14,000 | 9,000 | 9,500 |
| Flexural Strength, p. s. i.: |  |  |  |
| Lengthwise | 28,000 |  |  |
| Crosswise | 24,000 | 20,000 | 20,000 |
| Compressive Strength | 45,000 | 35,000 | 38,000 |
| Impact Fatigue (relative): |  |  |  |
| Flatwise (no. of blows) | 5,000 | 5 | 50 |
| Edgewise (no. of blows) | 4 | 1 | 3 |

As indicated by the table, the mechanical properties of the unwoven fabric laminate are superior in all respects to the comparable properties of woven fabric laminates. Especially noteworthy is the superiority in impact fatigue strength, and the unusual superiority in impact fatigue strength against blows directed in the flatwise direction. Cloth and laminates exhibit impact fatigue strength in the flatwise direction five times as great as in edgewise direction, and the flatwise superiority in the case of canvas laminates is approximately 17 to 1.

In the case of unwoven fabric laminates, however, not only is the edgewise impact fatigue strength greater than that of woven fabric laminates, but the impact fatigue strength in the flatwise direction exceeds the edgewise strength by a ratio of 1,250 to 1.

The unusually high resistance of unwoven fabric laminate to impact fatigue in the flatwise direction is of particular importance in the present invention, wherein the end blocks are disposed to take full advantage thereof. Shuttles constructed according to the invention may be utilized in high speed operation for exceedingly long periods of time, with no cracking, splitting or other damage to the nose pieces thereof. The same property may be taken advantage of in the side pieces, by utilizing the same material disposed in the manner described.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A multiple piece shuttle comprising end blocks and opposed side pieces joining said end blocks, said end blocks being composed of laminated plastic material reinforced with parallel layers of unwoven fabric, the laminations of said end blocks being disposed in planes normal to the shuttle axis.

2. A shuttle as defined in claim 1, including a metal nose piece mounted in each of said end blocks.

3. A shuttle as defined in claim 1, wherein said unwoven fabric reinforcement comprises cotton fibers arranged in random relationship.

4. A shuttle as defined in claim 1, wherein said side pieces also are composed of laminated plastic material reinforced with parallel layers of unwoven fabric, the laminations of said side pieces being disposed flat-wise in planes parallel to the shuttle axis and normal to the top and bottom of the shuttle.

References Cited in the file of this patent

UNITED STATES PATENTS

| 1,805,090 | Hills | May 12, 1931 |
| 2,720,224 | Neeley | Oct. 11, 1955 |

FOREIGN PATENTS

| 307,032 | Great Britain | Sept. 12, 1929 |